Sept. 2, 1947. S. B. HASELTINE 2,426,685
FRICTION SHOCK ABSORBER
Filed April 17, 1944
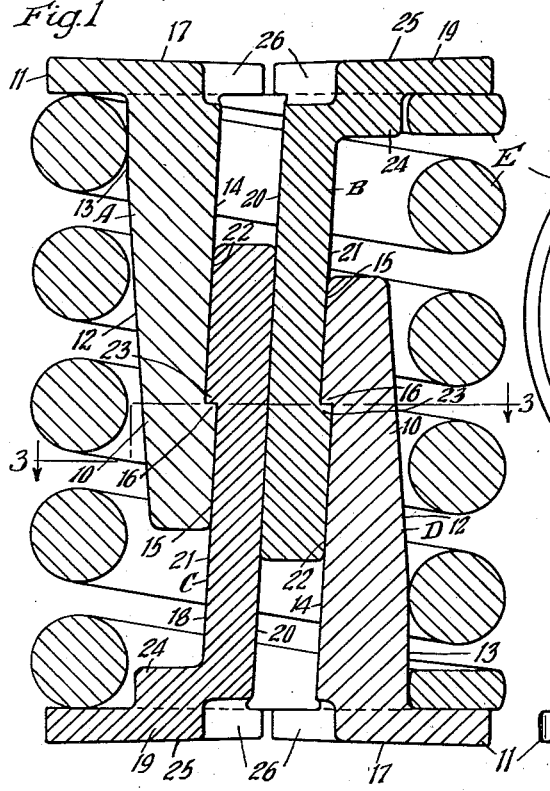
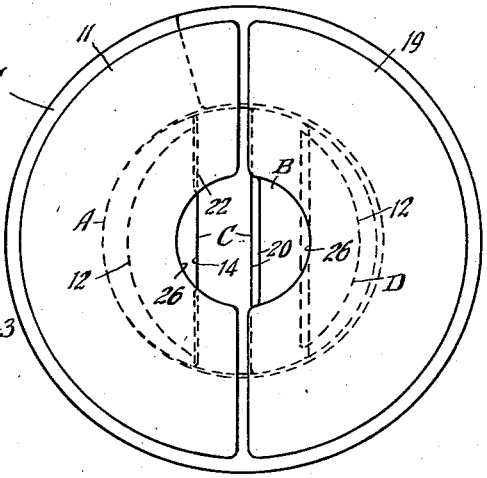
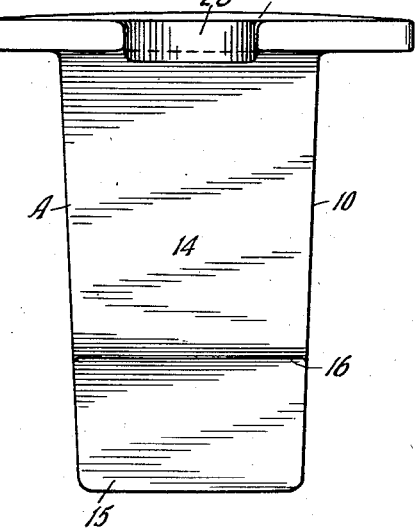
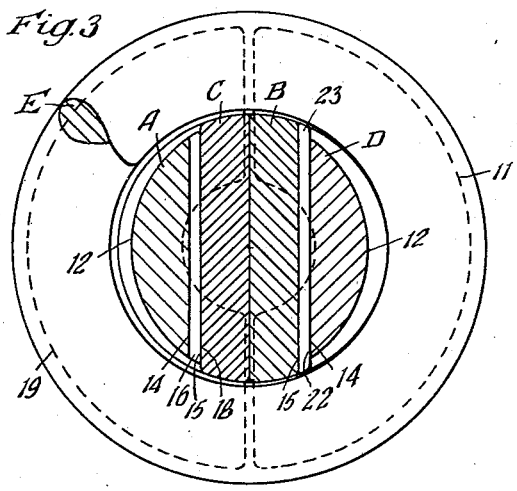
Inventor
Stacy B. Haseltine
By Henry Fuchs
Atty.

Patented Sept. 2, 1947

2,426,685

UNITED STATES PATENT OFFICE 2,426,685

FRICTION SHOCK ABSORBER

Stacy B. Haseltine, La Grange, Ill., assignor to W. H. Miner, Inc., Chicago, Ill., a corporation of Delaware Application April 17, 1944, Serial No. 531,385

4 Claims. (Cl. 267—9)

This invention relates to improvements in friction shock absorbers, especially adapted for snubbing or dampening the action of the usual truck springs of railway cars.

One object of the invention is to provide a friction shock absorber comprising a plurality of relatively movable friction members having interengaging, inclined friction surfaces extending lengthwise thereof, together with spring means opposing relative movement of said members, wherein the spring means also presses the friction members into tight frictional contact with each other.

A further object of the invention is to provide a friction shock absorber comprising two pairs of lengthwise relatively movable friction members, and spring means yieldingly opposing relative lengthwise movement of said pairs of members, wherein the members of one pair are intercalated with the members of the other pair and the members of each pair are laterally tiltable toward and away from each other and the spring means exerts pressure on the tiltable members to press the same against each other into tight frictional contact.

Other objects of the invention will more clearly appear from the description and claims hereinafter following.

In the drawing forming a part of this specification, Figure 1 is a transverse, vertical sectional view of the improved shock absorber, said section being in a plane coincident with the central vertical axis of the mechanism. Figure 2 is a top plan view of Figure 1. Figure 3 is a transverse, horizontal sectional view, corresponding substantially to the line 3—3 of Figure 1. Figure 4 is an elevational view of one of the friction members of the improved shock absorber, the member illustrated being the upper one at the left hand side of Figure 1, looking from right to left in said figure.

My improved shock absorber comprises broadly a pair of upper friction members A and B; a pair of lower friction members C and D; and a spring resistance E surrounding the friction members and yieldingly opposing relative lengthwise movement of the same.

The friction members A and D are of like design, but reversely arranged, the member D being inverted with respect to the position of the member A. The members A and D are arranged at opposite sides of the mechanism, respectively at the top and bottom thereof, as clearly shown in Figure 1.

Each member A and D comprises a relatively heavy, vertically disposed plate 10 and a laterally projecting base flange 11 at the outer end of the plate, the base flange 11 of the member A being at the upper end thereof and projecting laterally outwardly, and the base flange 11 of the member D being at the lower end thereof and projecting laterally outwardly in a direction opposite to the flange of the member A. The friction plate 10 of each member is tapered toward its outer end and presents on its outer side a longitudinally extending, transversely curved surface 12. The surface 12 is inclined with respect to the vertical axis of the mechanism except at the base of said member where it extends vertically, being parallel to the axis of the device, said vertical surface portion being indicated by 13. On the inner side, the plate 10 of each member A and D presents two longitudinally extending friction surfaces 14 and 15, which are inclined with respect to the central vertical axis of the device. As shown in Figure 1, the surfaces 14 and 15 are at the inner and outer ends of each of said members, the surface 15 being laterally inwardly offset with respect to the surface 14 to provide a transversely extending stop shoulder 16. The friction surfaces 14 and 15 of the plate 10 of the member A, considered as extending downwardly, are inclined away from the central vertical axis, and the friction surfaces 14 and 15 of the plate 10 of the member D, considered as extending upwardly, are inclined away from said axis also. The friction surfaces 14—14 and 15—15 of the members A and D preferably have the same inclination, the outer surface 12 of the plate 10 of the member A, considered as extending downwardly, is inclined toward the central vertical axis of the mechanism, and the surface 12 of the plate 10 of the member D, considered as extending upwardly, is also inclined inwardly toward said axis.

The base flange 11 of the member A has the upper surface 17 thereof disposed at a slight angle to a plane at right angles to the central vertical axis of the mechanism. The lower surface of the base flange 11 of the member D, which is also indicated by 17, is similarly disposed. In other words, the surface 17 of the flange 11 of the member A is inclined to the horizontal in outward direction and the surface 17 of the flange 11 of the member D is inclined in inward direction. The posts A and D are thus tiltable on their respective bases, the base flanges 11 of said posts being adapted to fulcrum at their outer ends.

The friction members B and C are of similar design. Each of these members comprises a vertically extending, relatively heavy plate member 18 and a base flange 19 projecting laterally outwardly therefrom. On the inner side the plate 18 of each member B and C is provided with a longitudinally extending, flat friction surface 20 inclined to the vertical. The friction surfaces 20 of the plates 18 of the members B and C are slidingly engaged with each other. On the outer side, the plate of each member B and C has a longitudinally extending pair of friction surfaces 21 and 22. The friction surfaces 21 and 22 are at the inner and outer ends respectively of said plates of the members B and C, the surface 22 of each plate being offset laterally outwardly with respect to the surface 21 thereof, thereby providing a stop shoulder 23 between said surfaces. The friction surfaces 21 and 22 are correspondingly inclined to and engage with the surfaces 15 and 14, respectively, of the adjacent member of the first pair A and D.

The base flange 19 of each member B and C is thickened adjacent the outer side of the plate 18 thereof, thus providing a ledge or shoulder 24, acting as an abutment or stop to limit compression of the mechanism by engagement of the end of the corresponding member A or D therewith. The outer surface 25 of the base flange 19 is at a slight angle to the horizontal, the surface 25 of the flange 19 of the member B being inclined upwardly and outwardly, and that of the member C being inclined upwardly and inwardly so that the members B and C are fulcrumed for rocking movement inwardly toward each other.

The friction members A and D are disposed at opposite sides of the mechanism, the member A being at the left hand side and the member D at the right hand side, as shown in Figure 1, with the flange 11 of the base of the member A at the upper end of the mechanism and projecting laterally outwardly, and the friction surfaces 14 and 15 of the plate 10 of said member facing inwardly, and with the flange 11 at the base of the member D at the lower end of the mechanism and projecting laterally outwardly, and the friction surfaces 14 and 15 of the plate 10 of said member D facing inwardly and opposed to the friction surfaces of the member A. The friction members B and C are disposed at opposite sides of the center of the mechanism, the member C being at the left hand side and the member B at the right hand side, as shown in Figure 1, with the flanged end of the former at the lower end of the mechanism and that of the member B at the upper end. The friction plate 18 of the member B depends from the flange 19 thereof and has the friction surface 20, which is on the inner side of the same, slidingly engaged with the friction surface 20 of the upstanding plate 18 of the member C. The outer friction surfaces of the members B and C are respectively engaged with the interior friction surfaces 21 and 22 of the members D and A.

The shoulders 16—16 of the members A and D engage respectively with the shoulders 23—23 of the members C and B and limit lengthwise separation of the upper and lower members of the mechanism and serve to hold the same assembled.

The spring E, which is in the form of a single, relatively heavy coil, surrounds the upper and lower friction members A, B, C, and D and bears at its upper end on the flanges 11 and 19 of the members A and B and at the lower end on the flanges 11 and 19 of the members D and C. The spring E is under initial compression in the normal expanded condition of the shock absorber and presses on the base members to tilt the members A and C and the members B and D inwardly toward each other. In other words, all of the friction members of the device are tiltable inwardly toward the central axis of the mechanism. The spring E also resists relative lengthwise approach of the friction members A—B and C—D and acts to restore these parts to their normal release position. As shown most clearly in Figure 1, the spring E closely embraces the friction members, and at its upper and lower ends has the inner sides of the coils thereof engaged with the outer surfaces 13—13 of the members A and D, thus yieldingly resisting lateral outward displacement of these members.

To accommodate the spring centering projections usually employed on the top and bottom spring follower plates of a cluster of truck springs, the base portions of the members A, B, C, and D are recessed to provide seats 26—26.

The improved shock absorber preferably replaces one of the spring units of a truck spring cluster, that is, several of such shock absorbers may be employed in a single spring cluster, replacing two or more units of the same, said shock absorber being interposed between the top and bottom spring follower plates of the spring cluster.

The operation of the improved shock absorber is as follows: Upon the spring cluster of the truck of a railway car being compressed between the top and bottom spring follower plates of said cluster, the shock absorber is compressed therewith, forcing the friction members A and B and the friction members C and D toward each other, lengthwise of the mechanism, against the resistance of the spring E, thereby effecting relative sliding movement thereof on their friction surfaces. Due to the inclination of the friction surfaces of all of the friction members of the device, the top friction members A and B and the bottom friction members C and D are displaced laterally with respect to each other or tilted slightly. This lateral separation and tilting action is resisted by the spring E, which, due to its pressure on the flanges of the friction members, resists outward tilting movement of the same. The lateral separation of the friction members is also resisted by canting action of the spring E which bears on the outer surfaces 13—13 of the members A and D, as hereinbefore pointed out.

During compression of the mechanism, high frictional resistance is thus produced to effectively snub the action of the truck springs.

As the spring follower plates of the truck springs are separated due to recoil of the springs, the friction members A—B and C—D are moved apart lengthwise of the mechanism by the expansive action of the spring E, thereby restoring the parts to the normal release position shown in Figure 1, lengthwise separation of the upper and lower friction members being positively limited by engagement of the shoulders 16—16 of the members A and B with the shoulders 23—23 of the members D and C.

I have herein shown and described what I now consider the preferred manner of carrying out my invention, but the same is merely illustrative and I contemplate all changes and modifications that come within the scope of the claims appended hereto.

I claim:

1. In a shock absorber, the combination with a plurality of lengthwise extending friction members, said members being arranged in sets at opposite ends of the mechanism with the members of one set alternated with the members of the other set, said members of said two sets having interengaging friction surfaces, all of said surfaces being inclined lengthwise of the mechanism in the same direction, said two sets being relatively movable lengthwise of the mechanism, said members being tiltably supported for movement toward each other; of a spring surrounding said friction members and bearing thereon to press the same against each other and also oppose relative lengthwise movement of said sets toward each other.

2. In a shock absorber, the combination with a pair of friction members at opposite ends of the mechanism having longitudinally extending, interengaging, inclined friction surfaces on their inner sides and laterally outwardly extending, base flanges at their outer ends, said flanges being fulcrumed at their outer ends; of a second pair of friction members at opposite ends of the mechanism having lengthwise extending, inclined friction surfaces on their inner sides engaging lengthwise extending, inclined friction surfaces on the outer sides of said first named members, said second named members having laterally outwardly projecting flanges at their outer ends, said flanges being fulcrumed at their outer ends; and a coil spring surrounding all of said members and bearing at opposite ends on the base flanges at the outer ends of said first and second named friction members to yieldingly resist relative lengthwise movement of said members toward each other and outward tilting movement of the same.

3. In a friction shock absorber, the combination with a pair of upper and lower friction members having cooperating, lengthwise extending, correspondingly inclined, interengaging friction surfaces on their inner sides, said members being slidable lengthwise with respect to each other; of an additional pair of upper and lower friction members disposed respectively on opposite sides of said first named friction members and having sliding frictional engagement with the outer sides of said first named lower and upper members, respectively, on friction surfaces correspondingly inclined to said first named friction surfaces, each of said upper and lower members having a laterally extending flange projecting from the outer side thereof; and a spring surrounding said upper and lower members, said spring being interposed between and engaging said flanges of said upper and lower members to oppose relative approach of said upper and lower members lengthwise of the mechanism, said spring opposing lateral separation of said members.

4. In a friction shock absorber, the combination with an inner upper friction member having a longitudinally disposed, inclined friction surface on the inner side, said member having a laterally extending base flange at the upper end projecting from the outer side thereof; of an inner lower friction member having a longitudinally disposed, inclined friction surface on the inner side thereof, said last named member having a laterally extending base flange at the lower end projecting from the outer side thereof; upper and lower outer friction members embracing said inner members at opposite sides, said upper outer friction member having lengthwise sliding engagement with the outer side of said lower inner member, and said lower outer member having lengthwise sliding engagement with the outer side of said upper inner member, said upper outer member having a laterally extending base flange at the upper end projecting from the outer side thereof, said lower outer member having a laterally extending base flange at the lower end projecting from the outer side thereof, said base flanges of the inner and outer members being fulcrumed on their outer ends to mount said members for tilting movement; and a spring surrounding said members and bearing at its upper and lower ends on said flanges of said upper inner and outer members and said lower inner and outer members.

STACY B. HASELTINE.

REFERENCES CITED

The following references are of record in the file of this patent:

UNITED STATES PATENTS

| Number | Name | Date |
|---|---|---|
| 1,127,657 | McCormick | Feb. 9, 1915 |
| 488,474 | Gibbs | Dec. 20, 1892 |
| 709,999 | McCord | Sept. 30, 1902 |
| 1,694,987 | Sherman et al. | Dec. 11, 1928 |
| 1,938,715 | Miner | Dec. 12, 1933 |
| 2,143,154 | Johnson | Jan. 10, 1939 |